United States Patent [19]

Yamaguchi et al.

[11] Patent Number: 4,830,762

[45] Date of Patent: May 16, 1989

[54] METHOD FOR FIRE EXTINGUISHMENT OF LIQUID CHLOROSILANE COMPOUND

[75] Inventors: Hisayoshi Yamaguchi, Tokyo; Tamotsu Yanagisawa, Niigata; Masao Yabuzuka, Gunma; Takashi Tanaka; Masakatu Shimizu, both of Niigata, all of Japan

[73] Assignee: Shin-Etsu Handotai Co., Ltd., Tokyo, Japan

[21] Appl. No.: 92,037

[22] Filed: Sep. 2, 1987

[30] Foreign Application Priority Data

| | | | |
|---|---|---|---|
| Sep. 22, 1986 | [JP] | Japan | 61-224329 |
| Feb. 2, 1987 | [JP] | Japan | 62-22110 |

[51] Int. Cl.[4] .................... C09K 21/00

[52] U.S. Cl. .................... 252/2; 169/46; 169/47; 252/8

[58] Field of Search .................... 169/46, 47, 65, 9; 252/2, 8; 106/15.05, 18.11, 18.12

[56] References Cited

U.S. PATENT DOCUMENTS

| | | | |
|---|---|---|---|
| 2,294,532 | 9/1942 | Fahey et al. | 252/2 |
| 2,368,209 | 1/1945 | Fahey et al. | 252/2 |
| 2,880,172 | 3/1959 | McCutchan | 252/2 |
| 3,055,435 | 9/1962 | Warnock et al. | 252/2 |
| 3,393,155 | 7/1968 | Schutte et al. | 252/2 |
| 3,830,738 | 8/1974 | Cottrell | 252/2 |
| 3,963,627 | 6/1976 | Cottrell | 252/2 |
| 4,173,538 | 11/1979 | Herbline | 252/2 |
| 4,226,727 | 10/1980 | Tarpley, Jr. et al. | 252/8 |

FOREIGN PATENT DOCUMENTS

| | | | |
|---|---|---|---|
| 0122576 | 7/1985 | Japan | 252/2 |
| 2060572 | 3/1987 | Japan | 252/2 |

OTHER PUBLICATIONS

"Emergency Response Plan", Union Carbide, (3/1/80).
"6.2 Chlorosilanes", Dow Corning Publication, Properties and Essential Information for Handling and Use of Chlorosilanes.

*Primary Examiner*—Howard J. Locker
*Attorney, Agent, or Firm*—Jules E. Goldberg

[57] ABSTRACT

The invention provides a rapid and reliable method for extinguishment of fire on a chlorosilane compound such as trichlorosilane which is hardly extinguishable once set on fire by any conventional fire-extinguishing methods. The inventive method comprises sprinkling an inert siliceous powder composed of porous particles of specified silica or silica-alumina content having a specified particle diameter, pore diameter and porosity over the surface of the burning chlorosilane compound. The efficiency of fire-extinguishment can further be enhanced when sprinkling of the porous siliceous powder is followed by spraying of water or a highly halogenated hydrocarbon compound, e.g., monobromo monochloromethane and carbon tetrachloride, over the siliceous powder.

5 Claims, No Drawings

METHOD FOR FIRE EXTINGUISHMENT OF LIQUID CHLOROSILANE COMPOUND

BACKGROUND OF THE INVENTION

The present invention relates to a method for fire extinguishment on a liquid chlorosilane compound or, more particularly, relates to a method of fire extinguishment on a chlorosilane compound by sprinkling an inert powdery material over the surface.

As is well known, chlorosilane compounds, such as trichlorosilane, dimethyl chlorosilane and the like, are very useful chemical starting materials in various modern industries such as manufacture of semiconductor silicon, synthetic quartz, silicone polymers and the like and the consumption of these materials in industries are rapidly increasing year by year. A very serious problem in these industries is the accident of fire on the chlorosilane compound which is usually a very inflammable liquid because chlorosilane compounds are generally very unstable in air having a relatively low flash point. Moreover, burning chlorosilane compounds produce a large volume of toxic gases and the fire on a burning chlorosilane compound can be extinguished only with great difficulties.

Various kinds of fire-extinguishing agents of course have been proposed in the prior art for fire extinguishment on such a chlorosilane compound but few of them are quite effective, if not ineffective. Even worse, the ingredients of some of conventional fire-extinguishing agents in a powdery form may react with the chlorosilane compound to promote formation of toxic or inflammable gases. Fire-extinguishing agents in a gaseous or liquid form, such as carbon dioxide gas and certain highly halogenated hydrocarbon compounds, are also not effective for fire extinguishment on chlorosilane compounds. In place of these manufactured fire-extinguishing agents, dry sand and water as natural materials can also be used for the purpose without noticeable effect of fire extinguishment. For example, fire on a chlorosilane compound can be extinguished only by sprinkling a large volume of sand thereover. When natural sand is used as such, impurity materials contained in the sand may eventually react with the chlorosilane compound to produce toxic gases. The effectiveness of water as a fire-extinguishing agent of chlorosilane compounds is relatively low. Moreover, violent reactions disadvantageously take place between water and the chlorosilane compound to produce toxic gases such as hydrogen chloride and to cause formation of a large amount of a gel-like material. Certain chlorosilane compounds, when reacted with water, may produce hydrogen gas which itself is inflammable or explosive in an oxidizing atmosphere resulting in a secondary hazard.

Accordingly, it is an urgent technical problem in industries to establish an efficient and safe method for fire extinguishment on a chlorosilane compound without the above described disadvantages and problems in the prior art methods.

SUMMARY OF THE INVENTION

Accordingly, the present invention, which has been completed as a result of the extensive investigations undertaken with an object to solve the above described problems, provides a method for fire extinguishment on a combustible liquid chlorosilane compound which comprises sprinkling porous particles of an inert material over the surface of the chlorosilane compound. The amount of the porous inert powder sprinkled over the surface of a burning chlorosilane compound should be at least 100 kg per cubic meter of the chlorosilane compound.

In particular, the particles of the inert powdery material should be porous siliceous particles mainly composed of silica or silica-alumina havng a porosity in the range from 45 to 85% and a pore diameter in the range from 0.1 to 100 $\mu m$ and having a particle diameter in the range from 5 $\mu m$ to 5 mm, the contents of silica and silica-alumina in the siliceous particles being at least 80% by weight and at least 90% by weight, respectively.

The above described method of the invention is of course quite effective in most cases to extinguish fire on a chlorosilane compound. There are some cases, however, that the above described method is still insufficient to rapidly extinguish the fire on certain kinds of the chlorosilane compounds, especially, with extreme violence of fire. The invention also provides a method for efficiently extinguishing fire in such a case, which comprises, following the above mentioned sprinkling of a porous inert powdery material over the fire, spraying water or a highly halogenated liquid hydrocarbon compound over the fire in an amount of, for example, at least 10% by volume of the chlorosilane compound.

DETAILED DESCRIPTION OF THE PREFERRED EMBODIMENTS

The chlorosilane compound as the objective material of the inventive fire-extinguishing method includes various kinds of chlorosilane compound used in the manufacture of semiconductor silicon, synthetic quartz, silicone polymers and the like and represented by the general formula $$R_uSiH_vCl_w, \quad (I)$$

in which R is a monovalent hydrocarbon group exemplified by alkyl groups, e.g., methyl and ethyl groups, alkenyl groups, e.g. vinyl group, and aryl groups, e.g., phenyl group, the subscript u is zero, 1, 2 or 3, the subscript v is zero, 1, 2 or 3 and the subscript w is 1, 2 or 3 with the proviso that $u+v+w=4$. Typical examples of the chlorosilane compound include trichlorosilane of the formula $SiHCl_3$, trimethyl chlorosilane of the formula $(CH_3)_3SiCl$, methyl dichlorosilane of the formula $CH_3SiHCl_2$, dimethyl dichlorosilane of the formula $(CH_3)_2SiCl_2$, methyl trichlorosilane of the formula $CH_3SiCl_3$, phenyl trichlorosilane of the formula $C_6H_5SiCl_3$ and diphenyl dichlorosilane of the formula $(C_6H_5)_2SiCl_2$ and the like. Each of these chlorosilane compounds is a very inflammable liquid having a relatively low flash point and, once it is set on fire, the fire can be extinguished only with great difficulties. In particular, extinguishment of fire is extremely difficult when the fire is on trichlorosilane, trimethyl chlorosilane or methyl dichlorosilane. Combustion of these chlorosilane compounds unavoidably produces toxic hydrogen chloride gas and, in some cases, even more toxic chlorine gas.

The fire-extinguishing material to be sprinkled over a burning chlorosilane compound is a porous inert powdery material which should preferably be a siliceous powder composed of at least 80% by weight of silica ($SiO_2$) or at least 90% by weight of silicaalumina ($SiO_2$-

$+Al_2O_3$). The powder should contain an as little as possible amount of impurities responsible for the formation of toxic gases by reacting with the chlorosilane compound and the particles thereof should have a porosity in the range from 45 to 85%. Several natural materials meet the requirements after a treatment with an acid, drying, calcination and the like pretreatment depending on the nature of the material occurring in nature. Such a natural product more or less contains various impurities including iron oxide $Fe_2O_3$, calcium oxide CaO, magnesium oxide MgO, potassium oxide $K_2O$, sodium silicate $xNa_2O \cdot ySiO_2$ and the like, of which the impurities of alkali and alkaline earth oxides are particularly undesirable because these impurities may react directly with the chlorosilane compound to produce toxic gases such as hydrogen chloride or inflammable gases such as hydrogen. It is of course that the moisture more or less contained in the fire-extinguishing material reacts with the chlorosilane compound to hydrolyze the same so that the material should be dried to minimize the moisture content therein.

The siliceous powdery material should have a particle size distribution in the range from 5 μm to 5 mm. When the powder contains a substantial amount of particles having a particle diameter smaller than 5 μm, such fine particles may readily be blown away by the flame violently rising up on the burning chlorosilane so that the content of such fine particles should be as small as possible. This requirement of the particle size distribution in the inventive method should be compared with that in the conventional powdery fire-extinguishing agents which should have a particle diamater not exceeding 177 μm according to the industrial standard and actually have a particle diameter of around 10 μm as an optimum condition. When the porous siliceous powder is used as a filling of a fire extinguisher and ejected from the nozzle, in particular, the powder should have a particle size distribution preferably in the range from 5 to 200 μm.

As is mentioned above, the particles of the powdery material should be porous. Preferably, the particles should have a pore diameter in the range from 0.1 to 100 μm and a porosity in the range from 45 to 85%. This requirement means that conventional porous siliceous materials such as silica gels and silica-alumina gels are not suitable for the object of the inventive method because most of the pores in these materials are smaller than 0.1 μm in diameter. When the pore diameter is too small with a consequently very large effective surface area, a considerable amount of heat of adsorption may be generated by the adsorption of the chlorosilane compound on the effective surface of the porous particles in contact therewith to cause undesirable increase in the temperature of the chlorosilane compound by the heat of adsorption.

One of the suitable porous siliceous materials to meet the above described requirements is a natural amorphous silica sand as a kind of geyserite and sold under a tradename of Silton 3S which should be calcined and refined prior to use. The powdery siliceous material thus obtained typically contains 89.1% by weight of silica and a porosity of 70% with a true density of 2.3 g/cm$^3$. When a silica-alumina based porous powdery material is desired in view of the somewhat larger true density, the above mentioned Silton 3S is uniformly blended with kaolin together with water and the blend is dried, calcined, pulverized and finally classified relative to the particle size using a sieve. The thus prepared porous silica-alumina powdery material typically contains 68% by weight of silica and 23% by weight of alumina when the blending ratio of Silton 3S and kaolin is 1:1 by weight and have a porosity of 80% with a true density of 2.5 g/cm$^3$.

The amount of the sprinkled porous siliceous powder is of course important in order to efficiently extinguish the fire on a chlorosilane compound. The method of the invention can be efficiently practiced usually sprinkling the powder in an amount of at least 100 kg per cubic meter of the burning chlorosilane compound.

Sprinkling of the above described porous siliceous powder over the burning chlorosilane compound may be not fully effective, as is sometimes the case when trichlorosilane, methyl dichlorosilane and the like having hydrogen atoms directly bonded to the silicon atoms and a relatively low boiling point are set on fire. In this case, the ambient temperature often approaches the boiling point of the chlorosilane compound. To overcome such a difficulty, sprinkling of the porous siliceous powder should be followed by spraying of water or a highly halogenated liquid hydrocarbon compound over the burning chlorosilane compound. The highly halogenated liquid hydrocarbon compound is represented by the general formula $$C_pH_qX_r, \quad \text{(II)}$$

in which X is an atom of halogen selected from the group consisting of fluorine, chlorine and bromine, the subscript p is 1 or 2, the subscript q is zero, 1 or 2 and the subscript r is $2p+2-q$. Typical examples of such highly halogenated hydrocarbon compounds include monobromo monochloro methane, carbon tetrachloride and dibromo tetrafluoroethane sold under tradenames of Halon 1011, Halon 1040 and Halon 2402, respectively, of which monobromo monochloromethane is preferred in the inventive method. Tetrafluoro dibromoethane is less effective since it has a relatively low boiling point and the latent heat of vaporization thereof is about a half of that of monochloro monobromomethane or carbon tetrachloride. Carbon tetrachloride is a traditional fire-extinguishing agent effective in the fire accident of various combustible materials. This material, however, may react with water or steam in the flame to produce very toxic phosgene $COCl_2$ so that it is not approved by the regulation of laws in many countries as a generalpurpose fire-extinguishing agent. Notwithstanding this problem, even carbon tetrachloride can be used as the spraying liquid in the inventive method. This is because, in the inventive method, spraying of carbon tetrachloride is always preceded by sprinkling of the porous siliceous powder over the burning chlorosilane compound to suppress or control the flame. The method of spraying water or the highly halogenated hydrocarbon liquid is not particularly limitative but it is desirable that the liquid is sprayed in as fine as possible droplets and should be sprayed uniformly all over the layer of the already sprinkled porous siliceous powder. The amount of sprayed water or highly halogenated hydrocarbon compound should be at least 10% by volume of the burning chlorosilane compound.

Caution should be given that spraying of the highly halogenated hydrocarbon compound must be preceded by all means by sprinkling of a sufficient amount of the porous siliceous powder all over the surface of the burning chlorosilane compound since otherwise no fire-extinguishing or suppressing effect can be obtained rather with an effect of increasing the violence of the fire if not to mention formation of toxic gases such as phospgene, hydrogen chloride, hydrogen bromide, hydrogen fluoride and the like.

According to the theoretical consideration for the mechanisms of fire-extinguishment, at least one of the following four conditions must be satisfied including:

(1) removing effect, i.e. to remove the combustible material away from the burning area;
(2) suffocating effect, i.e. to shield the burning area from supply of oxygen;
(3) cooling effect, i.e. to suppress burning of the combustible material by absorbing the heat of combustion and cooling the burning material below the ignition temperature of the material; and
(4) suppressing effect, i.e. to retard the reaction of the combustible material with oxygen.

In many cases, the efficiency of fire-extinguishment can be synergistically increased by satisfying two or more of these conditions simultaneously in comparison with the efficiency when only one of them is satisfied.

When the porous siliceous powder is sprinkled over the burning chlorosilane compound according to the inventive method, the powder undergoes absolutely no chemical changes since the powder has no reactivity with the chlorosilane compound and it is itself incombustible and thermally stable. By virtue of the porosity of the powder, the sprinkled powder first absorbs the chlorosilane compound as the combustible material to exhibit the above mentioned removing effect. Further, the suffocating effect can be obtained by sprinkling the powder in such a sufficiently large volume that the open surface of the burning chlorosilane compound is entirely covered therewith to shield the surface from the atmospheric oxygen.

As is mentioned before, sprinkling of the porous siliceous powder over the burning chlorosilane compound may not always be fully effective to rapidly extinguish the fire, especially, when a chlorosilane having hydrogen atoms directly bonded to the silicon atoms and having a relatively low boiling point, such as trichlorosilane and methyl dichlorosilane, has been set on fire at a relatively high ambient temperature. When water or a highly halogenated hydrocarbon compound, each being a liquid at room temperature, is sprayed over the surface of the porous siliceous powder covering the surface of the chlorosilane compound, the sprayed liquid is absorbed by the porous powder to enhance the suffocating effect to more fully shield the surface of the burning chlorosilane compound and, in addition, the absorbed liquid is then vaporized by the heat of combustion to absorb a large quantity of the latent heat for vaporization so that the cooling effect is obtained to exhibit a synergistic effect with suffocation thus to extinguish the fire very rapidly and efficiently. The above described mechanisms well explain the unexpectedly high efficiency for the rapid and reliable extinguishment of fire on any burning chlorosilane compound according to the inventive method including spraying of water or a highly halogenated liquid hydrocarbon compound.

To summarize, the method of the present invention is very effective for fire extinguishment on a hardly extinguishable chlorosilane compound such as trichlorosilane, methyl dichlorosilane, trimethyl chlorosilane and the like by sprinkling the specific porous inert powder over the surface of the burning chlorosilane compound, if necesary, followed by spraying of a liquid which may be water or a highly halogenated hydrocarbon compound. The advantages obtained by this fire-extinguishing method include that:

(1) any violent fire on a hardly extinguishable chlorosilane compound can be extinguished rapidly and efficiently;
(2) the fire-extinguishing work can be performed with a minimum volume of toxic gases produced by the reaction of the chlorosilane compound and the fire-extinguishing agent;
(3) no secondary hazard may take place during and after the fire-extinguishing works;
(4) the cost for the fire-extinguishing agent is low because the porous siliceous powder is an inexpensive material and a small amount thereof is effective for the purpose; and
(5) contamination of the environment is insignificant because the fire can be extinguished by merely sprinkling the porous siliceous powder over the surface followed, if necessary, by spraying water or a halogenated hydrocarbon liquid.

In the following, the method of the invention for extinguishment of fire on a chlorosilane compound is described in more detail by way of examples making comparison with conventional methods. In the following fire-extinguishing tests, the result of each test for a particular combination of the inflammable chlorosilane compound and the fire-extinguishing method was evaluated in four ratings of A, B, C and D, the notation A corresponding to a very high fire-extinguishing efficiency, D corresponding to a poor fire-extinguishing efficiency to be avoided for the purpose and B and C corresponding to intermediate efficiencies between A and D.

EXAMPLE 1

Fire-extinguishment test was undertaken using trichlorosilane, which is a notoriously dangerous material with extreme difficulties of fire extinguishment thereon, as a burning liquid. Thus, 50 ml of trichlorosilane were taken in a stainless steel-made vessel having a diameter of 10 cm and a depth of 6 cm and ignited. When the flame had spread all over the liquid surface, 33 g of a porous siliceous powder were sprinkled so that the fire could immediately be extinguished without evolution of any toxic gas or white fume (fire-extinguishing efficiency A).

The porous siliceous powder used here was Silton 3S after calcination and acid-leaching to remove alkaline material followed by washing with water having a particle diameter in the range from 10 to 500 μm, a pore diameter in the range from 0.2 to 10 μm and porosity of 70%.

For comparison, similar fire-extinguishment tests were undertaken by replacing 33 g of the porous siliceous powder with 1025 g of dry sand, 500 g of water or 88 g of a conventional fire-extinguishing agent composed of 50% by weight of sodium hydrogencarbonate, 22% by weight of alumina, 15% by weight of silica gel and 13% by weight of other ingredients. The results of these comparative tests were that the use of dry sand was not practically feasible due to the so large amount of the sand required for complete extinguishment of fire (fire-extinguishing efficiency C) while sprinkling of water produced large volumes of toxic gases and white fume (fire-extinguishing efficiency D) and the conventional fire-extinguishing agent immediately reacted with the chlorosilane compound to produce large volumes of toxic gases and white fume although the amount thereof required for extinguishment of the fire was relatively small in comparison with dry sand and water (fire-extinguishing efficiency C).

EXAMPLE 2

Fire-extinguishment test was undertaken using 500 ml of trichlorosilane taken in an iron-made vessel of 2500 ml capacity having a diameter of 18 cm and a depth of 10 cm and igniting the silane to allow it burning for 30 seconds prior to the start of the fire-extinguishing work. Thereafter, 500 g of the same porous siliceous powder as used in Example 1 were sprinkled over the surface of the burning silane so that the fire was immediately extinguished without being followed by evolution of white fume (fire-extinguishing efficiency A).

For comparison, similar fire-extinguishment tests were undertaken by sprinkling or spraying, in place of 500 g of the porous siliceous powder according to the invention, 4200 g of dry sand, 3200 g of water, 1500 g of a so-called BC fire-extinguishing agent mainly composed of sodium hydrogencarbonate or 1500 g of a fire-extinguishing agent for chlorosilanes specifically formulated with sodium hydrogencarbonate, alumina and silica gel for fire extinguishment on chlorosilanes. The results were as follows. Thus, sprinkling of dry sand was quite ineffective and the fire could not be extinguished at all despite the so large amount of the sprinkled sand (fire-extinguishing efficiency D). Spraying of water was effective in extinguishment of the fire but a large volume of white fume, which was presumably composed of silica and hydrogen chloride, was produced during the period before and after extinguishment of the fire (fire-extinguishing efficiency C). The BC fire extinguishing agent was also effective to suppress the violence of the fire within a relatively short time but a large number of bubbles of, presumably, the gasified silane compound were noticed rising in the liquid (fire-extinguishing efficiency C). The last mentioned fire extinguishing agent for chlorosilanes was also effective to suppress the violence of the fire within a relatively short time but this fire-extinguishing agent could not be evaluated as suitable for practical purposes because the remaining volume of the silane compound was heated up to a boiling condition along with production of toxic gases in a high concentration (fire-extinguishing efficiency D).

The results of the above described comparative tests indicate that, although some of the conventional methods may be effective in fire extinguishment on trichlorosilane, it is a serious common problem in using these conventional fire-extinguishing agents that a large volume of toxic gases and white fume is unavoidably produced in the course of sprinkling of the fire-extinguishing agent if not to mention the disadvantage that the amount thereof required for complete fire extinguishment is quite large in comparison with the porous siliceous powder according to the invention.

On the contrary, the method of the present invention is outstandingly advantageous because not only the fire on a chlorosilane compound can readily and rapidly be extinguished by sprinkling a small amount of the porous siliceous powder but also only a very small volume of toxic gases is produced in the course of the powder sprinkling and absolutely no white fume was produced after extinguishment of the fire.

EXAMPLE 3

Fire-extinguishment tests were undertaken for four kinds of chlorosilanes including trimethyl chlorosilane, methyl dichlorosilane, dimethyl dichlorosilane and methyl trichlorosilane. The experimental procedure was substantially the same as in Example 1 using 50 ml of each of the chlorosilane compounds and the same porous siliceous powder. For comparison, similar tests were undertaken using dry sand as the fire-extinguishing agent. The results of these tests were as follows.

Trimethyl chlorosilane

The fire on the silane compound could be extinguished by sprinkling 150 g of the porous siliceous powder over the silane compound according to the invention absolutely without production of toxic gases and white fume (fire-extinguishing efficiency B) while 430 g of dry sand were required for extinguishing the fire after the liquid was heated to boiling with evolution of toxic gases even after extinguishment of the fire (fire-extinguishing efficiency C).

Methyl dichlorosilane

The fire on the silane compound could be extinguished by sprinkling 150 g of the porous siliceous powder over the silane compound according to the invention absolutely without production of toxic gases and white fume (fire-efficiency B) while sprinkling of 500 g of dry sand was ineffective in extinguishing the fire (fire-extinguishing efficiency D).

Dimethyl dichlorosilane

The fire on the silane compound could be duly extinguished by sprinkling 75 g of the porous siliceous powder over the silane compound according to the invention absolutely without production of toxic gases and white fume after extinguishment of the fire (fire-extinguishing efficiency A). The fire also could be extinguished by sprinkling 340 g of dry sand over the silane compound. In this case, however, the silane liquid was heated to boiling along with evolution of a large volume of toxic gases which lasted even after extinguishment of the fire (fire-extinguishing efficiency C).

Methyl trichlorosilane

The fire could be easily extinguished by sprinkling only 15 g of the porous siliceous powder without gas evolution even after extinguishment of the fire (fire-extinguishing efficiency A). The fire could also be extinguished by sprinkling 250 g of dry sand (fire-extinguishing efficiency B).

As is understood from the above given results of the fire extinguishment tests, the method of the present invention is very effective for fire extinguishment of on dimethyl dichlorosilane and methyl trichlorosilane and fully practicable for the fire on trimethyl chlorosilane and methyl dichlorosilane.

EXAMPLE 4

Fire-extinguishment tests were undertaken using trichlorosilane, methyl dichlorosilane and trimethyl chlorosilane as the inflammable liquids at an ambient temperature of 30° C. in an atmosphere of 90% relative humidity. These chlorosilane compounds are notorious in respect of the difficulty of fire extinguishment thereon. Thus, each a 50 ml portion of the silane compound was taken in a stainless steel-made vessel having a diameter of 10 cm and a depth of 6 cm and ignited to be allowed burning for 20 seconds before the start of the fire extinguishing work and thereafter 50 g or 70 g of the same porous siliceous powder as used in Example 1 were sprinkled over the surface of the burning silane compound. Separately, further tests were undertaken in which sprinkling of 50 g or 70 g of the porous siliceous powder was followed by spraying of monobromo monochloromethane, carbon tetrachloride or water. The results of these tests were as follows.

Trichlorosilane

Sprinkling of 50 g of the powder was not fully effective in extinguishing the fire though with suppression of fuming (fire-extinguishing efficiency C). When sprinkling of 50 g of the powder was followed by spraying of 5 g of monobromo monochloromethane, the fire could readily be extinguished within 15 seconds (fire-extinguishing efficiency A). Spraying of 6 g of carbon tetrachloride after the powder sprinkling was also effective to extinguish the fire within 20 seconds (fire-extinguishing efficiency B). Spraying of 10 g of water was also effective to extinguish the fire though with evolution of a small volume of toxic gases (fire-extinguishing efficiency B).

Methyl dichlorosilane

Sprinkling of 70 g of the powder was not sufficient to extinguish the fire although the violence of the fire could be somewhat subdued with indication of boiling by the noise within the liquid (fire-extinguishing efficiency D). Spraying of 10 g of monobromo monochloromethane following sprinkling of 70 g of the powder was effective to extinguish the fire within 30 seconds (fire-extinguishing efficiency B). Spraying of 10 g of water following sprinkling of 70 g of the powder was effective to extinguish the fire within 20 seconds (fire-extinguishing efficiency A).

Trimethyl chlorosilane

Sprinkling of 50 g of the powder was not sufficient to extinguish the fire although the violence of the fire could be somewhat subdued (fire-extinguishing efficiency C). Spraying of 5 g of monobromo monochloromethane following sprinkling of 50 g of the powder was effective readily to extinguish the fire within 15 seconds (fire-extinguishing efficiency A). Spraying of 10 g of water following sprinkling of 50 g of the powder was effective to extinguish the fire within 20 seconds (fire-extinguishing efficiency B).

The above described results of the fire extinguishment tests indicate that the effect of spraying of the highly halogenated hydrocarbon compound or water is very remarkable when complete extinguishment cannot be obtained by sprinkling the porous siliceous powder.

EXAMPLE 5

The procedure of the fire extinguishment tests using trichlorosilane, methyl dichlorosilane and trimethyl chlorosilane was substantially the same as in Example 4 except that the porous silica-based powder in Example 4 was replaced with a silicaalumina-based porous powder prepared from Silton 3S and a kaolin by blending in a 1:1 by weight ratio and kneading them with water, calcining the blend at 1000° C. and acid-leaching of the calcined material in hydrochloric acid followed by washing with water, dehydration and drying at 105° C. The thus obtained porous siliceous powder contained 68% by weight of silica $SiO_2$ and 25% by weight of alumina $Al_2O_3$ and had a particle diameter in the range from 40 to 500 μm with a pore diameter distributing in the range from 0.1 to 50 μm and a porosity of 80%. In each of the fire extinguishment tests carried out at an ambient temperature of 25° C., sprinkling of 70 g or 90 g of the powder was always followed by spraying of monobromo monochloromethane or water. The results of the fire extinguishment tests were as follows.

Trichlorosilane

Sprinkling of 70 g of the powder was effective in reducing the volume of the fume and the fire could be extinguished with 40 seconds by subsequent spraying of 10 g of monobromo monochloromethane (fire-extinguishing efficiency B). Replacement of 10 g of monobromo monochloromethane with 15 g of water was also effective in extinguishing the fire within 45 seconds (fire-extinguishing efficiency B).

Methyl dichlorosilane

Sprinkling of 90 g of the powder was effective in subdueing the violence of fire and the fire could be extinguished with 45 seconds by subsequent spraying of 10 g of monobromo monochloromethane (fire-extinguishing efficiency B). Replacement of monobromo monochloromethane with the same amount of water was also effective in extinguishing the fire within 45 seconds (fire-extinguishing efficiency B).

Trimethyl chlorosilane

Sprinkling of 70 g of the powder was effective in subdueing the violence of fire and the fire could be extinguished with 40 seconds by subsequent spraying of 10 g of monobromo monochloromethane (fire-extinguishing efficiency B). Replacement of 10 g of monobromo monochloromethane with 15 g of water was also effective in extinguishing the fire within 30 seconds (fire-extinguishing efficiency A).

What is claimed is:

1. A method for extinguishing fire on the surface of a liquid chlorosilane compound which comprises: sprinkling an inert siliceous powder consisting essentially of porous particles having a particle diameter in the range from 5 μm to 5 mm, a pore diameter in the range from 0.1 μm to 100 μm and a porosity in the range from 45% to 85%, the siliceous powder containing at least 80% by weight of silica or at least 90% by weight of silica and alumina, over the surface of the burning chlorosilane compounds.

2. The method of extinguishing fire on the surface of a liquid chlorosilane compound as claimed in claim 1 wherein the siliceous powder is sprinkled over the surface of the burning chlorosilane compound in an amount of at least 100 kg per cubic meter of the burning chlorosilane compound.

3. A method for extinguishing fire on the surface of a liquid chlorosilane compound which comprises the successive steps of:

(a) sprinkling an inert siliceous powder consisting essentially of porous particles having a particle diameter in the range from 5 μm to 5 mm, a pore diameter in the range from 0.1 μm to 100 μm and a porosity in the range from 45% to 85%, the siliceous powder containing at least 80% by weight of silica or at least 90% by weight of silica and alumina, over the surface of the burning chlorosilane compound; and then (b) spraying water or a highly halogenated liquid hydrocarbon compound over the inert powder.

4. The method for extinguishing fire on the surface of a liquid chlorosilane compound as claimed in claim 3 wherein the highly halogenated liquid hydrocarbon compound is selected from the group consisting of monobromo monochloromethane, carbon tetrachloride and tetrafluoro dibromoethane.

5. The method for extinguishing fire on the surface of a liquid chlorosilane compound as claimed in claim 3 wherein the siliceous powder is sprinkled over the surface of the burning chlorosilane compound in an amount of at least 100 kg per cubic meter of the burning chlorosilane compound.

* * * * *